United States Patent
Alakontiola

(10) Patent No.: US 6,812,973 B2
(45) Date of Patent: Nov. 2, 2004

(54) LIQUID CRYSTAL DISPLAY HAVING MOVABLE REFLECTOR SURFACES PROVIDING SUB-DISPLAYS VIEWABLE FROM DIFFERENT VIEWING DIRECTIONS

(75) Inventor: Heikki Alakontiola, Oulu (FI)

(73) Assignee: Nokia Corporation, Espoo (FI)

( * ) Notice: Subject to any disclaimer, the term of this patent is extended or adjusted under 35 U.S.C. 154(b) by 45 days.

(21) Appl. No.: 10/318,811

(22) Filed: Dec. 13, 2002

(65) Prior Publication Data
US 2003/0112390 A1 Jun. 19, 2003

(30) Foreign Application Priority Data
Dec. 17, 2001 (FI) .............................. 20012484

(51) Int. Cl.[7] ........................ G02F 1/13; G02F 1/1335
(52) U.S. Cl. ............................ 349/1; 349/67; 349/113
(58) Field of Search .......................... 349/113, 67, 1; 345/864; 455/566

(56) References Cited

U.S. PATENT DOCUMENTS 5,867,795 A * 2/1999 Novis et al. ................ 455/566
6,583,770 B1 * 6/2003 Antila et al. ................ 345/1.1
2003/0160919 A1 * 8/2003 Suzuki et al. ............... 349/113

FOREIGN PATENT DOCUMENTS

GB 2343324 5/2000

* cited by examiner

Primary Examiner—Huyen Ngo
(74) Attorney, Agent, or Firm—Harrington & Smith, LLP

(57) ABSTRACT

A liquid crystal display includes one LCD module with polarizers on both sides thereof. To generate the picture for LCD module the display includes a control unit to control the electric current to the electrodes of the module. The display additionally includes reflector surfaces to reflects rays of light into the viewing direction through the polarizers and LCD module. The display may further include light guides placed between the polarizers and reflector surface to provide a backlight for the display. The reflector surfaces are placed on opposing sides of the LCD module to provide sub-displays viewable from opposing directions on different sides of the LCD module. The reflector surfaces can be made fixed in the liquid crystal display or a reflector surface and light guide may form a unitary, movable cover which can cover the surface of the LCD module either completely or partly.

18 Claims, 2 Drawing Sheets

LIQUID CRYSTAL DISPLAY HAVING MOVABLE REFLECTOR SURFACES PROVIDING SUB-DISPLAYS VIEWABLE FROM DIFFERENT VIEWING DIRECTIONS

FIELD OF THE INVENTION

The invention relates to a liquid crystal display comprising one LCD module, polarizers on both surfaces of the LCD module, reflector surfaces and a display control unit.

BACKGROUND OF THE INVENTION

Liquid crystal displays, or LCDs, are used in a plurality of different devices such as watches, radios, calculators, portable computers and mobile phones, to list a few. FIG. 1 illustrates as an example the structural and operating principles of a conventional LCD. At the core of the LCD there is a liquid crystal layer between two layers of glass, where the orientation of the crystals is affected by transparent electrodes on the inner surfaces of the glass layers. These layers constitute the LCD module 10 of this presentation. On both surfaces of the LCD module there are polarizers 12 to polarize the light hitting the surface of the module. Placed against the outer surface of one of the polarizers is a reflector surface 14, reflecting back the rays of light arriving through the polarizers and LCD module. By conducting an electric current to the electrodes in the LCD module it is possible to orientate the liquid crystals in such manner that part of the polarized rays of light will not pass through the LCD module, whereby a pattern will become visible on the display. To improve the visibility of the pattern on the liquid crystal display there may additionally be a light guide 16 between the reflector surface and polarizer to provide a backlight which improves the visibility of the picture displayed, if necessary. The various component parts of LCDs, such as LCD modules, polarizers, reflector surface, and light guides, are commercially available parts and components known from the prior art, so they will not be described in more detail in this presentation.

As mobile phones in particular have become functionally more complex, it has become necessary to have telephone displays that can be viewed from different directions. Thus phones need to be equipped with several discrete liquid crystal displays, which naturally increases the manufacturing costs of the phone and adds to its weight and size. Publication GB 2343324 discloses a mobile phone in which there are LCDs on both sides of a hinged lid. In this solution the LCDs are placed on exactly the same location on the opposing sides of the lid so that the LCDs can share a "common" reflector surface. In this solution, too, there are two distinctly separate LCDs, installed against each other so that their viewing directions are on different sides of the lid. Use of a shared reflector surface cannot considerably reduce the manufacturing costs of a phone.

SUMMARY OF THE INVENTION

An object of the invention is to provide a liquid crystal display with a novel structure, viewable from two opposing directions, thus reducing the need for a plurality of separate liquid crystal displays.

A liquid crystal display according to the invention is characterized in that which is specified in the independent claim. Advantageous embodiments of the invention are presented in the dependent claims.

A liquid crystal display according to the invention has one LCD module with polarizers on both sides thereof. To generate the picture for the LCD module the display includes a control unit to control the electric current to the electrodes of the module. In this presentation, a "picture" refers to all visual material to be shown on the display: graphic images, moving images, text or animation, for example. The display additionally includes, in a known manner, reflector surfaces to reflect rays of light into the viewing direction through the polarizers and LCD module. The display may further include light guides placed between the polarizers and reflector surface to provide a backlight for the display. A backlight is important especially in LCDs which are used in poor lighting conditions. A basic idea of the invention is that reflector surfaces are provided on opposing sides of the LCD module. Thus there are provided in the same LCD module sub-displays viewed from opposing directions on the different sides of the LCD module.

In an advantageous embodiment of the invention the reflector surfaces are placed on different sides of the LCD module in a fixed manner. In that case their sizes are such that they only cover part of the total area of the LCD module.

In a second advantageous embodiment of the invention a reflector surface and light guide constitute a movable unitary lid covering the surface of the LCD module in whole or in part. A sub-display is then formed on that side of the LCD module where the lid is opened.

In a third advantageous embodiment of the invention the control unit is programmed so as to generate the picture on a sub-display in such a manner that the picture is always the right side up when viewed from the direction of viewing. In practice this means that a picture generated for the viewing direction of a first sub-display is converted, by a program, into a mirror image when viewed from the viewing direction of a second sub-display.

An advantage of the invention is that it reduces the number of materials and components needed to build displays and therefore reduces material costs compared to building two separate displays.

Another advantage of the invention is that the time needed to manufacture and install displays becomes shorter as only one display is needed instead of two separate displays.

A further advantage of the invention is that the total space requirement and weight of the displays are reduced which is useful especially in small portable terminals such as mobile phones.

BRIEF DESCRIPTION OF THE DRAWINGS

The invention is below described in detail. Reference is made to the accompanying drawings in which.

DETAILED DESCRIPTION OF THE INVENTION

Figure 1:
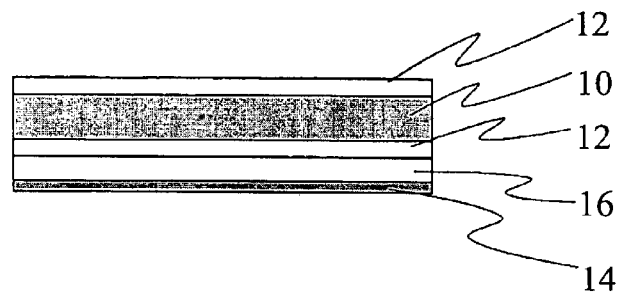
FIG. 1 shows by way of example a prior-art LCD in a lateral cross section.

FIG. 1 was discussed in conjunction with the description of the prior art.

Figure 2:
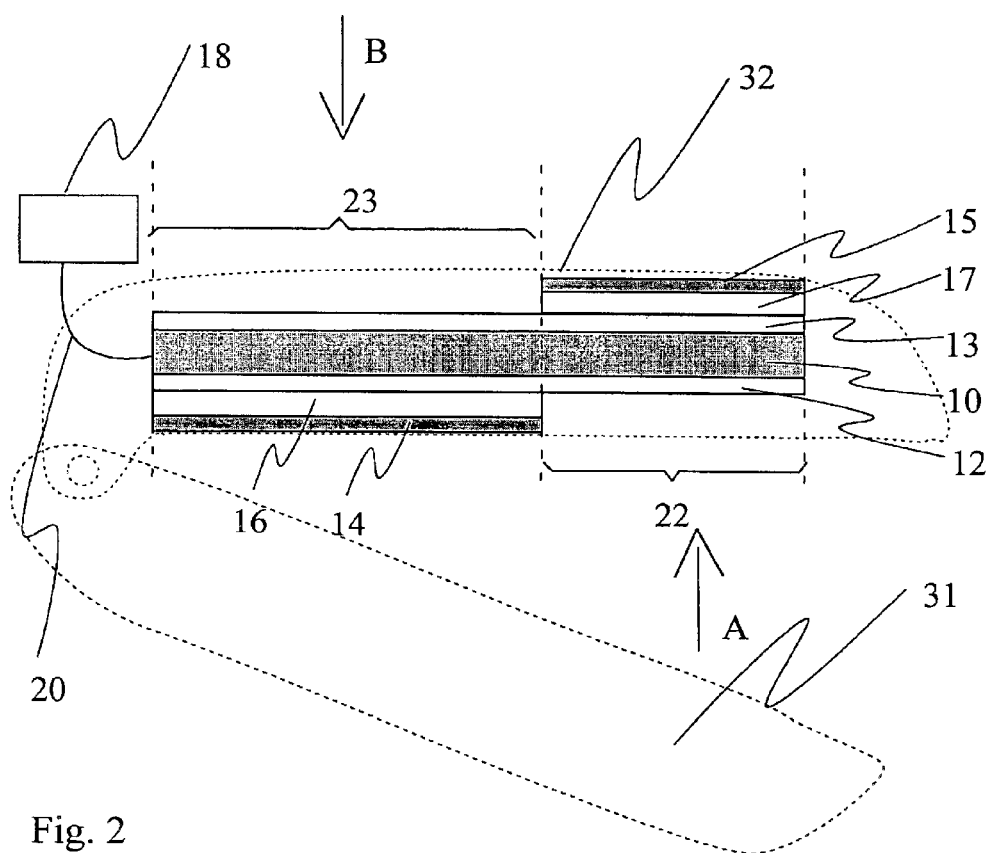
FIG. 2 shows by way of example an LCD according to the invention in a lateral cross section.

FIG. 2 shows by way of example a liquid crystal display in a lateral view. The LCD includes, in a known manner, an LCD module 10 with polarizers 12, 13 on both sides thereof. A first surface of a first polarizer 12 is placed against a second surface of the LCD module, and a second surface of a second polarizer 13 is placed against a first surface of the LCD module. The LCD module is coupled by conductors 20 to a control unit 18. The control unit is an electronic device by means of which a picture is generated on the display by controlling the electric current to the electrodes in the LCD module. The electrodes are placed in the LCD module advantageously in such a manner that the display is comprised of several so-called pixels that are controlled by means of the control unit and software therein.

On a second surface of the first polarizer 12 there is a first light guide 16, and on a second surface thereof there is a first reflector surface 14 which covers the light guide substantially in whole. The light guide 16 and reflector surface 14 are sized such that they cover only part of the first polarizer 12. Similarly, on a first surface of the second polarizer 13 there is a second light guide 17 on top of which there is a second reflector surface 15, which cover only part of the second polarizer 13. The light guides 16, 17 direct the rays of light from a light source (not shown) placed beside them towards the surface of the LCD module, thereby providing a backlight which enhances the visibility of the picture on the display. The backlight is particularly useful when the LCD is in an apparatus used in poorly lit conditions. However, the light guides are not essential components in a liquid crystal display according to the invention but the invention can be implemented without them as well.

Advantageously the light guides 16, 17 and reflector surfaces 14, 15 are sized such that their area combined is substantially equal to the area of the LCD module. Furthermore, the light guides and reflector surfaces are placed on opposing sides of the LCD module in such a manner that every point of the LCD module is covered by a light guide and reflector surface only on one side. A structure according to the invention thus comprises two separate sub-displays: a first sub-display 22, viewed from the direction indicated by arrow A, and a second sub-display 23, viewed from the direction indicated by arrow B. The core of both sub-displays is a single shared LCD module where the picture is generated by means of a control unit 18. In order for the pictures and in particular texts on the sub-displays to be the right side up, the control unit is programmed so that it knows which direction each part of the LCD module and individual pixel is viewed from. In an LCD according to the invention, the "mirroring" of pictures and texts in accordance with the viewing direction can be realized simply using a program in the control unit 18.

In an advantageous embodiment of the invention, a liquid crystal display like the one shown in FIG. 2 is placed in the flap 32 of a portable terminal, such as a mobile phone, which flap is attached to the body of the terminal 31 in a hinged manner. In this case the first sub-display 22 is placed on that side of the flap which folds against the body of the terminal, and the second sub-display 23 is placed on the opposite side of the flap. When the flap is in the "closed" position, against the body of the phone, only one of the sub-displays can be viewed by the user of the apparatus. In this situation the control unit 18 of the display is programmed to generate the picture only on one of the sub-displays. When the flap is opened, the first sub-display becomes the primary display and the control unit generates the picture on this sub-display. In this advantageous embodiment of the invention the control unit 18 comprises a sensor monitoring the status of the flap and generates the picture on the correct sub-display in each situation.

Figure 3A:
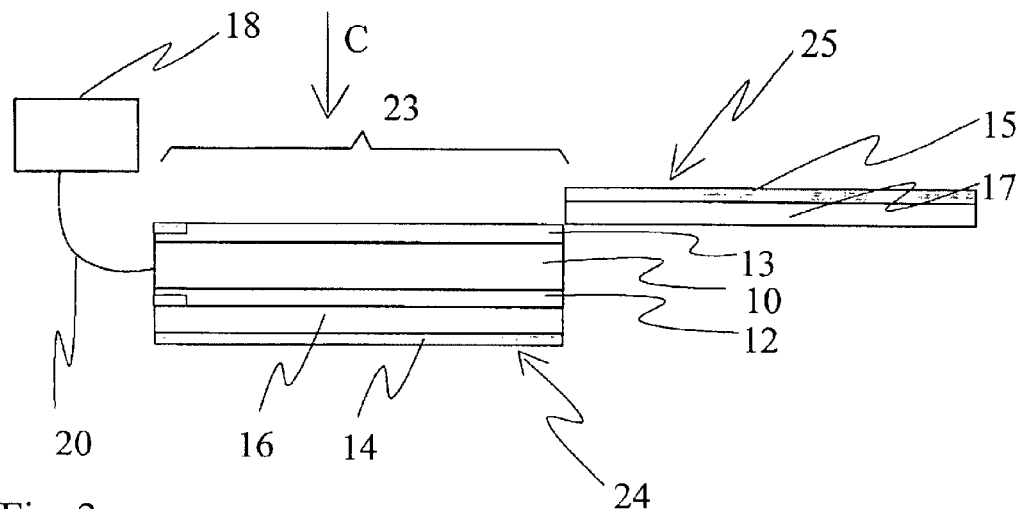
FIGS. 3a, 3b show by way of example an advantageous embodiment of an LCD according to the invention in a lateral cross section.
Figure 3B:
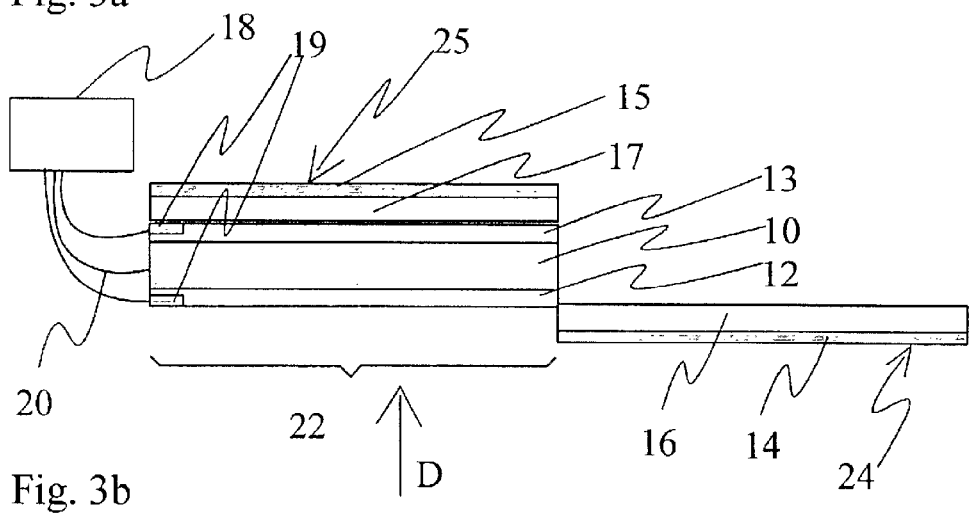

FIGS. 3a and 3b show by way of example a second advantageous embodiment of an LCD according to the invention. In this embodiment, too, the core of the liquid crystal display is an LCD module 10 with polarizers 12, 13 on both sides thereof. On each polarizer there is a light guide 16, 17 and reflector surface 14, 15. The light guide and reflector surface are movable within the LCD so that they can be moved either so as to cover the polarizer 12, 13 or so as to uncover the polarizer. The reflector surface is advantageously attached to the surface of the light guide in a fixed manner so that they constitute a structurally unitary movable cover 24, 25.

FIG. 3a depicts a situation in which a first cover 24 comprised of a first light guide 16 and first reflector surface 14 is placed on a first polarizer 12. A second cover 25 comprised of a second light guide 17 and second reflector surface 15 has been moved away from a second polarizer 13 so that it completely uncovers the latter. The cover 24 now completely prevents the viewing of the LCD module 10 from the direction of the first cover, and the picture is generated on the sub-display 23 viewed from the viewing direction indicated by arrow C, the size of the sub-display 23 being equal to that of the LCD module.

FIG. 3b depicts the LCD of FIG. 3a in a situation in which the second cover 25 has been moved so as to cover the second polarizer 13, and the first cover 24 has been moved so as to uncover polarizer 12. In this situation the picture is generated on the sub-display 22 which is viewed from a direction opposite to that of FIG. 3a, i.e. the direction indicated by arrow D. In this advantageous embodiment of the invention the LCD includes sensors 19 detecting the positions of the covers 24, 25, which sensors are connected to the control unit. Thus the control unit 18 can generate the picture on the display the right side up in accordance with the current viewing direction. The covers 24, 25 can be made movable in the body or frame of the LCD in various alternative ways (not shown), e.g. using a hinge or hinges or sliding attachment. The covers may also be comprised of a plurality of separate parts, opened and closed like venetian blinds.

Figure 4:
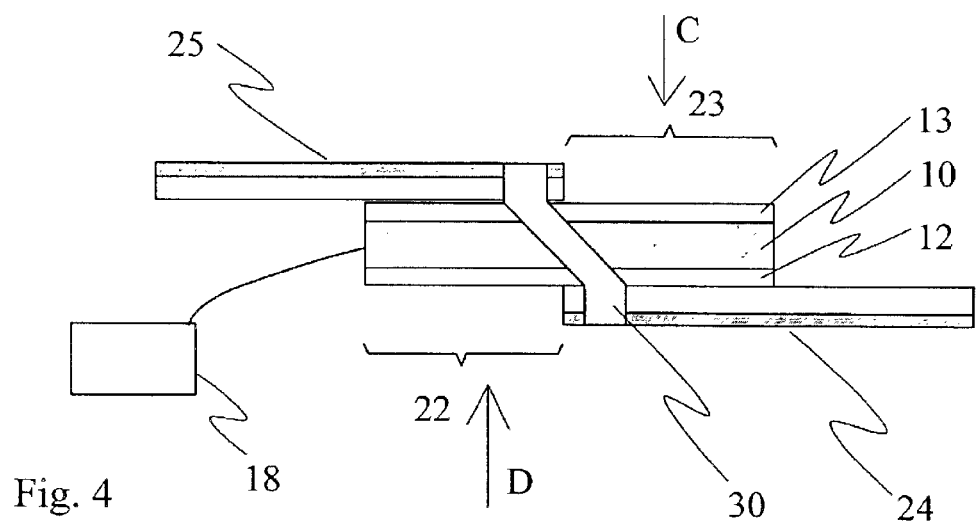
FIG. 4 shows by way of example another advantageous embodiment of an LCD according to the invention in a lateral cross section.

FIG. 4 shows by way of example a third advantageous embodiment of an LCD according to the invention in a lateral view. In this embodiment the covers 24, 25 comprised of a light guide 16, 17 and reflector surface 14, 15 are interconnected 30 so that when a first cover moves so as to cover the polarizer in viewing direction C, a second cover simultaneously moves so as to uncover the polarizer in viewing direction D. In FIG. 4 the covers are interconnected mechanically, but they can be interconnected in other ways, too. In their extreme positions the covers completely shut out one viewing direction. The display can then be viewed from the other direction only, and the size of the sub-display 22, 23 then equals that of the whole LCD module. In intermediate positions, as the one depicted in FIG. 4, the LCD is divided into two sub-displays 22, 23 viewable simultaneously from opposing directions. The display control unit divides the LCD module into sub-displays viewed from different directions according to information from sensors detecting the positions of the covers and generates the picture on them the right side up with respect to the viewing direction. So, in this advantageous embodiment of the invention the sizes of the sub-displays are not predetermined but their size is always determined by the position of the covers 24, 25.

In the above-described advantageous embodiments of the LCD according to the invention the light guide and reflector surface constitute a slab-like movable element, moved according to need either to cover or uncover the LCD module. A reflector surface may naturally be provided and removed in other ways, too, e.g. by a stationary film the reflecting properties of which are changed electrically or chemically. In the above-described advantageous embodiments the LCD module is divided into only two sub-displays 22, 23. It is obvious that according to the same principle the LCD module can be divided into more sub-displays viewable from opposing sides of the LCD module. A liquid crystal display according to the invention finds particular utility in small-sized portable terminals such as mobile phones but naturally it may be used in other applications as well.

Advantageous embodiments of the liquid crystal display according to the invention were described above. The invention is not limited to the solutions described above but the inventional idea can be applied in numerous ways within the scope defined by the appended claims.

What is claimed is:

1. A liquid crystal display with one LCD module, polarizers, reflectors on both surfaces of the LCD module, and a display control unit wherein the reflectors are placed on opposing sides of the LCD module in order to provide sub-displays viewable from different viewing directions, wherein each of the reflectors covers a partial surface of the sub-displays of the LCD module in a movable manner.

2. A liquid crystal display according to claim 1, wherein there is a light guide between one of said reflectors and the LCD module.

3. A liquid crystal display according to claim 2, wherein said light guide and said one of said reflectors form a unitary, movable cover for covering the surface of each of the sub-displays in part.

4. A liquid crystal display according to claim 3, wherein the display further comprises sensors to indicate the position of the movable cover to said control unit.

5. A liquid crystal display according to claim 1, wherein the control unit is programmed to generate a picture on each of the sub-displays.

6. A liquid crystal display according to claim 1, wherein the liquid crystal display is placed in a portable terminal.

7. A liquid crystal display according to claim 6, wherein the liquid crystal display is placed in a mobile phone.

8. A liquid crystal display according to claim 6, wherein the liquid crystal display is placed in a foldable flap of said portable terminal in such a manner that the viewing directions of a first sub-display and second sub-display are on opposing sides of the flap.

9. A liquid crystal display according to claim 8, wherein the control unit is programmed to generate a picture on only one of the sub-displays depending on the position of the flap.

10. A liquid crystal display with one LCD module, polarizers on both surfaces of the LCD module, reflector surfaces, and a display control unit wherein the reflector surfaces are placed on opposing sides of the LCD module in order to provide sub-displays viewable from different viewing directions, wherein there is a light guide between one of said reflector surfaces and the LCD module, wherein said light guide and said one reflector surface form a unitary, movable cover for covering the surface of the LCD module in whole where said unitary, movable cover is disposed on each one of opposing surfaces of the LCD module, and the display further comprises sensors to indicate the position of the movable covers to said control unit.

11. A liquid crystal display according to claim 10, wherein the covers are interconnected so that they can be moved simultaneously.

12. A liquid crystal display according to claim 10, wherein the control unit is programmed to generate an image on each of the sub-displays so as to have a correct viewing orientation when viewed from the viewing direction for a given one of said sub-displays.

13. A liquid crystal display according to claim 10, wherein the liquid crystal display comprises part of a portable terminal.

14. A liquid crystal display according to claim 13, wherein the liquid crystal display is placed in a foldable flap of said portable terminal in such a manner that the viewing directions of a first sub-display and second sub-display are on opposing sides of the flap.

15. A liquid crystal display according to claim 14, wherein the control unit is programmed to generate an image picture on only one of the sub-displays depending on the position of the flap.

16. A liquid crystal display according to claim 10, wherein the liquid crystal display comprises part of a mobile phone.

17. A mobile phone, comprising a controller and a liquid crystal display (LCD) module, said LCD module comprising on each of first and second opposing surfaces thereof a polarizer and a reflector surface to provide first and second sub-displays viewable from opposed viewing directions, wherein the reflector surfaces are movable and function as first and second movable covers disposed over said first and second opposing surfaces, respectively, and further comprising sensors coupled to said covers and to said controller for indicating to said controller a location of each of said first and second movable covers, where said controller is responsive to said sensors for selecting the respective one of said first and second sub-displays to be a viewing surface of said phone.

18. A mobile phone as in claim 17, where said first and second covers are interconnected so that they can be moved simultaneously.

* * * * *